US009214106B2

(12) United States Patent
Han et al.

(10) Patent No.: US 9,214,106 B2
(45) Date of Patent: Dec. 15, 2015

(54) PHOTO SENSOR, DISPLAY DEVICE INCLUDING THE SAME AND DRIVING METHOD THEREOF

(75) Inventors: Sang Youn Han, Seoul (KR); Byung Seong Bae, Suwon-si (KR); Jun Ho Song, Seongnam-si (KR); Sung Hoon Yang, Seoul (KR); Ho Sik Jeon, Asan-si (KR)

(73) Assignees: HOSEO UNIVERSITY ACADEMIC COOPERATION FOUNDATION, Chungcheongnam-Do (KR); SAMSUNG DISPLAY CO., LTD. (KR)

( * ) Notice: Subject to any disclaimer, the term of this patent is extended or adjusted under 35 U.S.C. 154(b) by 773 days.

(21) Appl. No.: 13/529,690

(22) Filed: Jun. 21, 2012

(65) Prior Publication Data

US 2013/0208261 A1 Aug. 15, 2013

(30) Foreign Application Priority Data

Feb. 10, 2012 (KR) ........................ 10-2012-0013990

(51) Int. Cl.
*G01N 21/00* (2006.01)
*G01J 1/00* (2006.01)
*G09G 3/20* (2006.01)

(52) U.S. Cl.
CPC .......... *G09G 3/2092* (2013.01); *G09G 2354/00* (2013.01); *G09G 2360/142* (2013.01)

(58) Field of Classification Search
CPC .............. G09G 3/2092; G09G 3/2096; G09G 2354/00; G09G 2360/142; G09G 2360/141; G09G 2360/14; G09G 2360/142145; G09G 2360/147; G09G 2360/148
See application file for complete search history.

(56) References Cited

U.S. PATENT DOCUMENTS

| | | | | |
|---|---|---|---|---|
| 7,184,009 | B2 * | 2/2007 | Bergquist | 345/90 |
| 7,391,004 | B2 | 6/2008 | Takashima et al. | |
| 7,652,663 | B2 * | 1/2010 | Sun | 345/207 |
| 7,759,628 | B2 | 7/2010 | Kanda et al. | |
| 8,154,523 | B2 * | 4/2012 | Miller et al. | 345/173 |
| 2009/0051645 | A1 * | 2/2009 | Chen et al. | 345/104 |

(Continued)

FOREIGN PATENT DOCUMENTS

| | | |
|---|---|---|
| JP | 2010-028320 A | 2/2010 |
| JP | 2011-107454 A | 6/2011 |
| KR | 1020090121635 A | 11/2009 |

OTHER PUBLICATIONS

Jean-Dominique Gallezot et al., "Photosensitivity of a-Si:H TFTs", The University of Michigan, Organic and Molecular Electroncs Laboratory, EECS Department, Asia Display/IDW '01, pp. 407-410.

*Primary Examiner* — John Lee
(74) *Attorney, Agent, or Firm* — Innovation Counsel LLP

(57) ABSTRACT

Provided are a photo sensor, a display device including the same, and a driving method thereof. The photo sensor includes: an amplifying element including an input terminal coupled to a scan line for receiving a scan signal, an output terminal configured to output a sensing signal, and a control terminal connected to a first node; a sensing capacitor connected with the first node; a photosensitive sensing element including a control terminal connected with a terminal of a first control signal, an output terminal connected with the first node, and an input terminal; and a reset element connected with the output terminal of the amplifying element and resetting the output terminal of the amplifying element to second voltage according to a reset control signal.

20 Claims, 4 Drawing Sheets

(56) References Cited

U.S. PATENT DOCUMENTS

| | | | | |
|---|---|---|---|---|
| 2009/0135333 | A1 | 5/2009 | Tai et al. | |
| 2009/0289910 | A1 | 11/2009 | Hattori | |
| 2009/0310007 | A1 | 12/2009 | Matsui et al. | |
| 2010/0091162 | A1 | 4/2010 | Chuang et al. | |
| 2010/0207889 | A1 | 8/2010 | Chen et al. | |
| 2010/0231562 | A1* | 9/2010 | Brown | 345/207 |
| 2010/0238135 | A1 | 9/2010 | Brown et al. | |
| 2011/0175871 | A1 | 7/2011 | Katoh et al. | |
| 2011/0242044 | A1* | 10/2011 | Liu | 345/174 |
| 2013/0208261 | A1* | 8/2013 | Han et al. | 356/72 |

* cited by examiner

PHOTO SENSOR, DISPLAY DEVICE INCLUDING THE SAME AND DRIVING METHOD THEREOF

CROSS-REFERENCE TO RELATED APPLICATION

This application claims priority to, and the benefit of, Korean Patent Application No. 10-2012-0013990 filed in the Korean Intellectual Property Office on Feb. 10, 2012, the entire contents of which are incorporated herein by reference.

BACKGROUND OF THE INVENTION (a) Field of the Invention

Embodiments of the invention relate generally to touch screen displays. More specifically, embodiments of the present invention relate to a photo sensor, a display device including the same, and a driving method therefor.

(b) Description of the Related Art

The development of touch screen display devices has also entailed development of touch sensors that can be incorporated into such displays. When a user's hand, a touch pen, or the like touches a screen of the display device, the sensor generates an output signal and provides the output signal to the display device. The display device determines touch information such as the presence or absence of touch, a touch position and the like therefrom, to transmit the touch information to an external device. The external device then transmits an image signal to the display device, based on the touch information.

One such sensor is a photo sensor. These sensors, which operate by sensing a change in light due to a touch, are each generally made up of a transistor which is a three-terminal element, and may determine the presence or absence of touch by sensing photo current produced by light irradiated upon a channel unit of the transistor. In this case, when the sensing signal from the photo current is sufficiently small, touch information such as the presence or absence of touch and a touch position may not be correct.

Meanwhile, the sensor may be attached to the display device, or may be formed in the display device. In either case, when a sensing circuit is complicated or overly large, an aperture ratio of the display device may be undesirably reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a photo sensor having advantages of increasing an aperture ratio of a touch screen display device and increasing accuracy of touch information. Also included are a display device including the same, and a driving method therefor.

An exemplary embodiment of the present invention provides a photo sensor, including: an amplifying element including an input terminal coupled to a scan line for receiving a scan signal, an output terminal configured to output a sensing signal, and a control terminal connected to a first node; a sensing capacitor connected with the first node; a photosensitive sensing element including a control terminal connected with a terminal of a first control signal, an output terminal connected with the first node, and an input terminal; and a reset element connected with the output terminal of the amplifying element and resetting the output terminal of the amplifying element to a second voltage according to a reset control signal.

Another exemplary embodiment of the present invention provides a display device, including: a scan signal line configured to transmit a scan signal; a sensing signal line configured to transmit a sensing signal; an amplifying element including an input terminal connected with the scan signal line, an output terminal connected with the sensing signal line, and a control terminal connected to a first node; a sensing capacitor connected with the first node; a photosensitive sensing element including a control terminal connected with a terminal of a first control signal, an output terminal connected with the first node, and an input terminal; and a reset element connected with the sensing signal line and resetting the sensing signal line to a second voltage according to a reset signal.

The scan signal may include a low voltage pulse which is outputted once for one frame, and the first control signal may include a high voltage pulse which is outputted once for one frame.

The reset element may include an input terminal configured to receive the second voltage, an output terminal connected with the output terminal of the amplifying element, and a control terminal configured to receive a reset control signal.

The reset control signal may include a high voltage pulse configured to be received by the control terminal of the reset element at a time between that of the low voltage pulse of the scan signal and that of the high voltage pulse of the first control signal.

The input terminal of the sensing element may be configured to receive a first voltage.

The input terminal and the control terminal of the sensing element may be connected to each other so as to each receive the first control signal.

The display device may further include a sensing signal processor connected with the sensing signal line and configured to generate touch information.

Yet another exemplary embodiment of the present invention provides a method of driving a photo sensor including an amplifying element with a control terminal connected to a first node, a sensing capacitor connected with the first node, a photosensitive sensing element with an output terminal connected with the first node, and a reset element connected with the output terminal of the amplifying element, the method including: applying a high voltage pulse of a first control signal to a control terminal of the sensing element to charge the first node at a predetermined voltage; applying a low voltage of the first control signal to the control terminal of the photosensitive sensing element to sense light; applying a low voltage pulse of a scan signal to an input terminal of the amplifying element so as to generate differing voltages at the output terminal of the amplifying element according to whether the sensing element is being irradiated by light or not; applying a high voltage of the scan signal to the input terminal of the amplifying element to output a sensing signal from the output terminal of the amplifying element; and applying a high voltage pulse of a reset control signal to a control terminal of the reset element to reset the output terminal of the amplifying element. The low voltage pulse of the scan signal may be outputted once for one frame, and the high voltage pulse of the first control signal may be outputted once for one frame.

The input terminal of the photosensitive sensing element may be connected to a terminal configured to receive a first voltage.

The input terminal and the control terminal of the sensing element may be connected to each other so as to each receive the first control signal.

The high voltage pulse of the reset control signal may be applied once every 1 horizontal period.

According to the exemplary embodiments of the present invention, it is possible to increase an aperture ratio of the display device including the photo sensor, and also to increase the accuracy of contact information.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the embodiments of the invention that follow, all stated numerical values and ranges are approximate, and can vary.

First, a display device or a touch panel including a photo sensor according to an exemplary embodiment of the present invention will be described with reference to FIG. 1.

Figure 1:
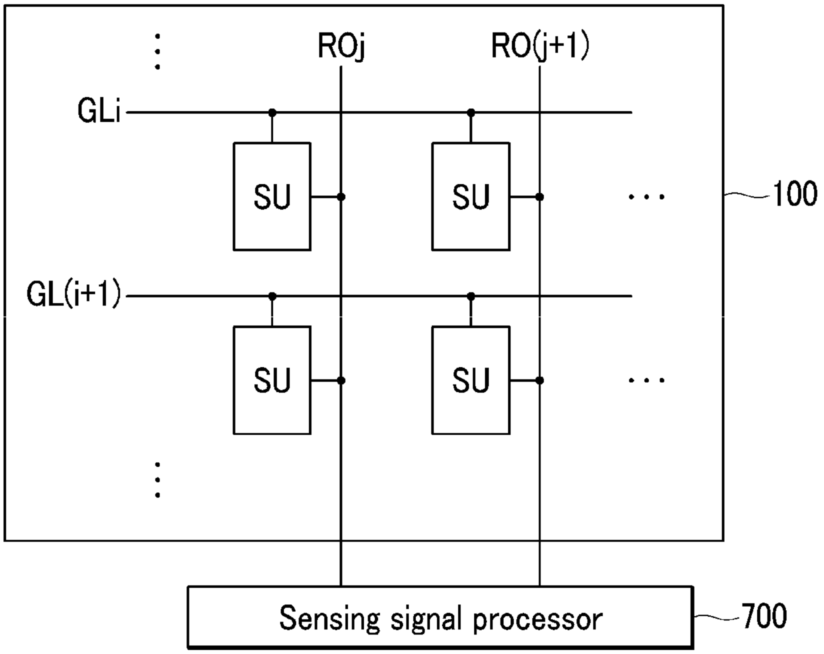
FIG. 1 is a plan view illustrating a display device or a touch panel including a photo sensor according to an exemplary embodiment of the present invention.

FIG. 1 is a plan view illustrating a display device or a touch panel including a photo sensor according to an exemplary embodiment of the present invention.

Referring to FIG. 1, a display device or a touch panel including a photo sensor according to an exemplary embodiment of the present invention includes a panel 100 where at least one photo sensor SU is positioned, and a sensing signal processor 700.

The photo sensor SU, as a sensor sensing light, may be positioned in the display device (referred to as an internal photo sensor) or be formed in a separate touch panel to be attached on the display panel of the display device (referred to as an external photo sensor). In the case of the internal photo sensor SU, in FIG. 1, the panel 100 may be a display panel of the display device and in the case of the external photo sensor SU, the panel 100 may be a touch panel attached to the display device.

The panel 100 includes a plurality of signal lines and at least one photo sensor SU connected thereto.

The signal lines include a plurality of scan signal lines ( . . . , GLi, GL(i+1), . . . ) transmitting scan signals, and a plurality of sensing signal lines ( . . . , ROj, RO(j+1), . . . ). The scan signal lines GLi and GL(i+1) extend substantially in a row direction and are substantially parallel to each other, and the sensing signal lines ROj and RO(j+1) may extend substantially in a column direction as well as being substantially parallel to each other. The sensing signal lines ROj and RO(j+1) transmit the sensing signals from the photo sensors SU. A predetermined voltage may be periodically applied to the sensing signal lines ROj and RO(j+1).

The photo sensor SU senses light to generate the sensing signal. In the case of an internal photo sensor SU, a plurality of pixels (not shown) which are arranged in a matrix form are further formed on the panel 100, and each photo sensor SU may be disposed between two adjacent pixels. The photo sensor SU may be disposed every n pixels (n>=1) one by one along a row direction or a column direction. The disposition density (i.e. the number of sensors per unit area) of the photo sensor SU may be substantially ⅓ of the disposition density of the pixels, but is not limited thereto and may vary according to sensing resolution.

Each photo sensor SU is connected to one scan signal line GLi or GL(i+1) and one sensing signal line ROj or RO(j+1), as shown.

The sensing signal processor 700 is connected to the sensing signal lines ROj and RO(j+1) of the panel 100. The sensing signal processor 700 receives and processes the sensing signals from the sensing signal lines ROj and RO(j+1) to generate touch information such as the presence or absence of touch, a touch position, and the like. The sensing signal processor 700 may include an integrator (not shown) including an OP amplifier connected to the sensing signal lines ROj and RO(j+1). OP amp based integrators are known. In this case, the integrator may output a voltage corresponding to output current of the sensing signal lines ROj and RO(j+1).

A more detailed structure of the photo sensor shown in FIG. 1 will now be described with reference to FIGS. 2 and 3.

Figure 2:
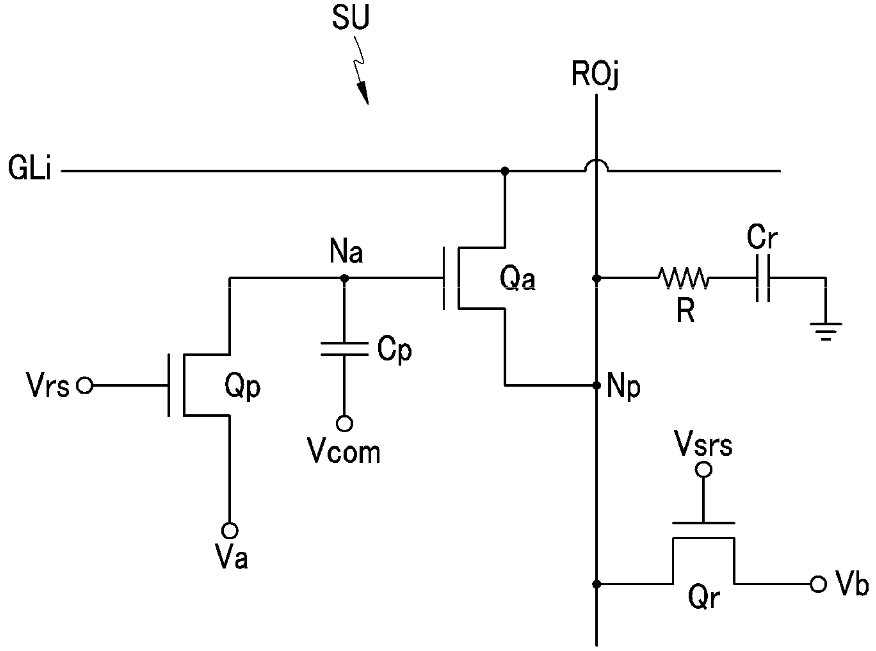
FIG. 2 is an equivalent circuit diagram of a photo sensor according to an exemplary embodiment of the present invention.
Figure 3:
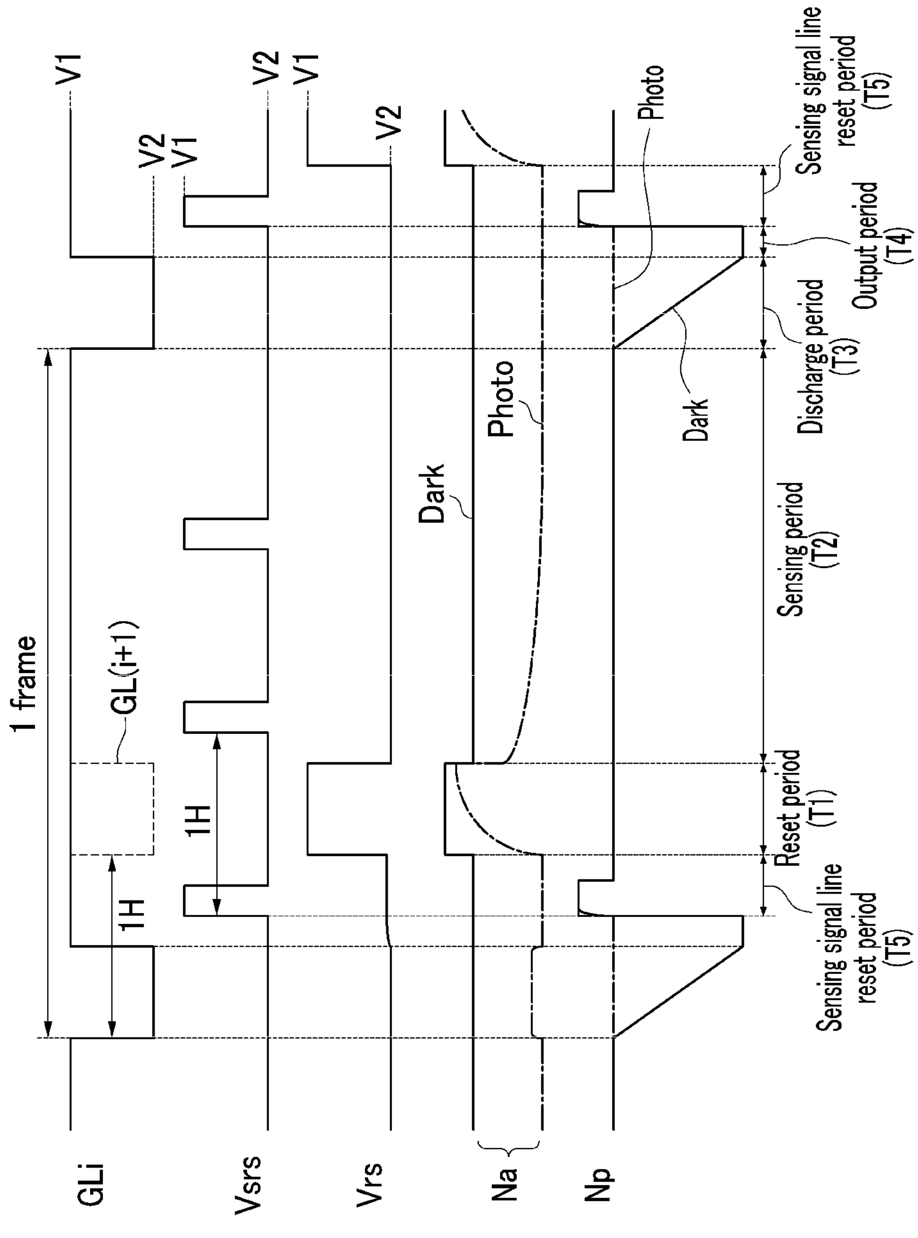
FIG. 3 is a waveform diagram illustrating various driving signals input and output to a photo sensor and voltage variation in some nodes in a photo sensor circuit diagram according to an exemplary embodiment of the present invention.

FIG. 2 is an equivalent circuit diagram of a photo sensor according to an exemplary embodiment of the present invention, and FIG. 3 is a waveform diagram illustrating various driving signals input to and output from a photo sensor, as well as voltage variation in some nodes in a photo sensor circuit diagram according to an exemplary embodiment of the present invention.

Referring to FIG. 2, a photo sensor SU according to an exemplary embodiment of the present invention includes a sensing element Qp, a sensing capacitor Cp, and an amplifying element Qa.

The sensing element Qp may be a three-terminal element, such as a thin film transistor or the like. A control terminal of the sensing element Qp is connected with a terminal of a first control signal Vrs, an input terminal thereof is connected with a first voltage Va, and an output terminal thereof is connected with a first node Na.

The sensing element Qp may be a photosensitive element that includes a photoelectric material generating photo current when light is irradiated onto it. An example of the sensing element Qp may include a thin film transistor having an amorphous silicon or polysilicon channel which can generate the photo current. The photo current which the sensing element Qp runs may be determined according to the first control signal Vrs.

Referring to FIG. 3, the first control signal Vrs includes a basic level of a low voltage V2 and a pulse with a high voltage V1. The high voltage pulse V1 of the first control signal Vrs may be applied once every frame. The high voltage V1 of the first control signal Vrs may be, for example, 20 V to 30V, and the low voltage V2 may be, for example, −20 V to −10 V, but these voltages are not limited thereto. A width of the pulse of the first control signal Vrs may be about 10 μs to 30 μs, but is not limited thereto.

The first control signal Vrs maintains a sufficiently low voltage V2 such that the sensing element Qp can maintain an off state when there is no light irradiated to the sensing element Qp, other than a time when the high voltage pulse V1 is applied. That is, when no light is irradiated upon element Qp, element Qp maintains its off state when V2 is applied, but is turned on when V1 is applied.

The first voltage Va input to the input terminal of the sensing element Qp may maintain a predetermined voltage level in a range from about 1 V to about 30 V, but is not limited thereto.

One terminal of the sensing capacitor Cp is connected with the first node Na and the other terminal is connected to a predetermined voltage such as the common voltage Vcom or the like. The sensing capacitor Cp serves to maintain the voltage of the first node Na.

The amplifying element Qa may be a three-terminal element, such as a thin film transistor or the like. A control terminal of the amplifying element Qa is connected with the first node Na, an input terminal thereof is connected with the scan signal line GLi, and an output terminal thereof is connected with the sensing signal line ROj. The amplifying element Qa may run current depending on the voltage level of the first node Na, that is, transmit the sensing signal to the sensing signal line ROj according to the voltage of the first node Na.

Referring to FIG. 3, scan signals which are applied to a plurality of scan signal lines . . . , GLi, GL(i+1), . . . positioned on the panel 100 include a basic level of the high voltage V1 and scan pulses of the low voltage V2. The scan pulses of the low voltage V2 are sequentially applied to the plurality of scan signal lines . . . , GLi, GL(i+1), . . . with a time interval of 1 horizontal period (referred to as 1H). The scan pulse of the low voltage V2 may be applied to one scan signal line GLi once per frame.

The high voltage V1 of the scan signal may be, for example, 20 V to 30 V and the low voltage V2 may be, for example, −20 V to −10 V, but the voltages are not limited thereto. A width of the scan pulse of the low voltage V2 may be in a range from about 10 μs to about 30 μs, but is not limited thereto.

Meanwhile, a parasitic capacitance Cr may be formed by the sensing signal line ROj and another element or a signal line of the panel 100 with a resistor R interposed therebetween. The parasitic capacitance Cr may vary according to a size or resolution of the panel 100.

Referring to FIGS. 1 and 2, the touch panel or the display device including the photo sensor SU according to the exemplary embodiment of the present invention further includes a reset element Qr connected to the sensing signal line ROj. The reset element Qr is included in the photo sensor SU in various exemplary embodiments of the present invention.

The reset element Qr may also be a three-terminal element such as a thin film transistor or the like. A control terminal of the reset element Qr is connected with a terminal of a reset control signal Vsrs, an input terminal thereof is connected with a second voltage Vb, and an output terminal thereof is connected with the sensing signal line ROj. The reset element Qr may transmit the second voltage Vb to the sensing signal line ROj according to the reset control signal Vsrs.

Referring to FIG. 3, the reset control signal Vsrs includes a basic level with low voltage V2, and a reset pulse with high voltage V1. The reset pulse may be applied once every horizontal period. As a result, the voltage of the sensing signal line ROj may be mostly maintained at the second voltage Vb.

The high voltage V1 of the reset control signal Vsrs may be, for example, 20 V to 30 V and the low voltage V2 may be, for example, −20 V to −10 V, but the voltages are not limited thereto. A duration of the reset pulse may be in a range from about 5 μs to about 15 μs, but is not limited thereto.

The reset element Qr may be integrated into the panel 100 shown in FIG. 1, and may also be positioned at or within the sensing signal processor 700.

A driving method of a photo sensor according to an exemplary embodiment of the present invention will now be described with reference to FIGS. 2 and 3.

The driving method of the photo sensor according to the exemplary embodiment of the present invention may include a reset period T1, a sensing period T2, a discharge period T3, an output period T4, and a sensing signal line reset period T5.

First, when the high voltage pulse V1 is applied to the terminal of the first control signal Vrs, the reset period T1 starts. During the reset period T1, the sensing element Qp is turned on and thus the first node Na is charged to a predetermined voltage. The charged voltage of the first node Na may vary according to a level of the first voltage Va.

Meanwhile, the voltage level of the first node Na at the beginning of the reset period T1 may vary according to whether light is irradiated upon the photo sensor before the pulse of the first control signal Vrs is applied. Further, the charged voltage of the first node Na at the end of the reset period T1 may vary according to the voltage level of the first node Na at the start point of the reset period T1 and the length of the reset period T1.

During the reset period T1, the scan signal of the scan signal line GLi to which the corresponding photo sensor SU is connected maintains the high voltage V1, and the reset control signal Vsrs maintains the low voltage V2.

During the reset period T1, since the scan signal of the scan signal line GLi is at high voltage V1, the amplifying element Qa is in its off state according to the following Equation 1 and as a result, the voltage of the second node Np may maintain a substantially constant voltage.

$$Vg-Vth<Vd \quad \text{[Equation 1]}$$

Herein, Vg represents a voltage of the control terminal with respect to the output terminal voltage of the amplifying element Qa, Vth represents the threshold voltage of the amplifying element Qa, and Vd represents the voltage of the input terminal with respect to the output terminal voltage of the amplifying element Qa.

Next, when the low voltage V2 is applied to the terminal of the first control signal Vrs, the sensing period T2 starts. During the sensing period T2, since the first control signal Vrs maintains the low voltage V2, the sensing element Qp is turned off. When light is not irradiated upon the sensing element Qp, current does not flow in the sensing element Qp and as a result, the voltage of the first node Na remains constant. However, when light is irradiated upon the sensing element Qp, photo current is generated in the sensing element Qp and thus electric charges of the first node Na are discharged to the first voltage Va side, and the voltage of the first node Na is decreased. Particularly, the lower the voltage of the first voltage Va, the much lower the voltage of the first node Na. As a result, the voltage of the first node Na may change according to whether the sensing element Qp is irradiated with light or not.

Even during the sensing period T2, the voltage of the second node Np may maintain a substantially constant voltage.

Next, when the scan pulse of low voltage V2 is applied to the scan signal of the scan signal line GLi, the discharge period T3 starts.

Since the following Equation 2 is not satisfied in a photo state (Photo), the amplifying element Qa is maintained in an off state and thus there is no change in the voltage of the second node Np. But since the amplifying element Qa is turned on according to the following Equation 2 in a dark state (Dark), the electric charge at the second node Np is discharged to the scan signal line GLi side, and thus the voltage of the second node Np is decreased.

$$Vg-Vth>Vd \quad \text{[Equation 2]}$$

Next, when high voltage V1 is applied to the scan signal of the scan signal line GLi again (i.e. the scan pulse ends), the output period T4 starts. During the output period T4, current depending on the voltage of the second node Np, i.e. the sensing signal, is output through the sensing signal line ROj. During the output period T4, a difference between the voltage V_p of the second node Np in the photo state (Photo) and the voltage V_d of the second node Np in the dark state (Dark) is represented by the difference in the current of the sensing signal line ROj. This difference indicates whether light is irradiated upon the photo sensor SU or not, thus indicating touch position and the like. Furthermore, in this exemplary embodiment of the present invention, since the presence or absence of touch is determined by using the amplified output of the amplifying element Qa controlled according to the voltage of the first node Na, accuracy of the determined touch information may further be increased.

Next, when the high voltage V1 is applied to the reset control signal Vsrs, the sensing signal line reset period T5 starts. When the reset control signal Vsrs becomes the high voltage V1, the reset element Qr is turned on and thus the second voltage Vb is transmitted to the sensing signal line ROj. As a result, the voltage of the second node Np is reset to a predetermined voltage as shown in FIG. 3.

As described above, the photo sensor according to the exemplary embodiment of the present invention amplifies the voltage of the first node Na connected to the sensing element Qp through the amplifying element Qa to output the amplified voltage to the sensing signal line ROj and generate the touch information, such that sensitivity is increased to improve accuracy of touch information. Simultaneously, since one sensing element SU includes only two thin film transistors, the sensing element SU has a relatively simple circuit structure as compared with conventional sensing elements that include an amplifying circuit. Accordingly, in the case of the internal photo sensor or the external photo sensor, it is possible to better prevent the aperture ratio of the display device from being decreased.

Figure 4:
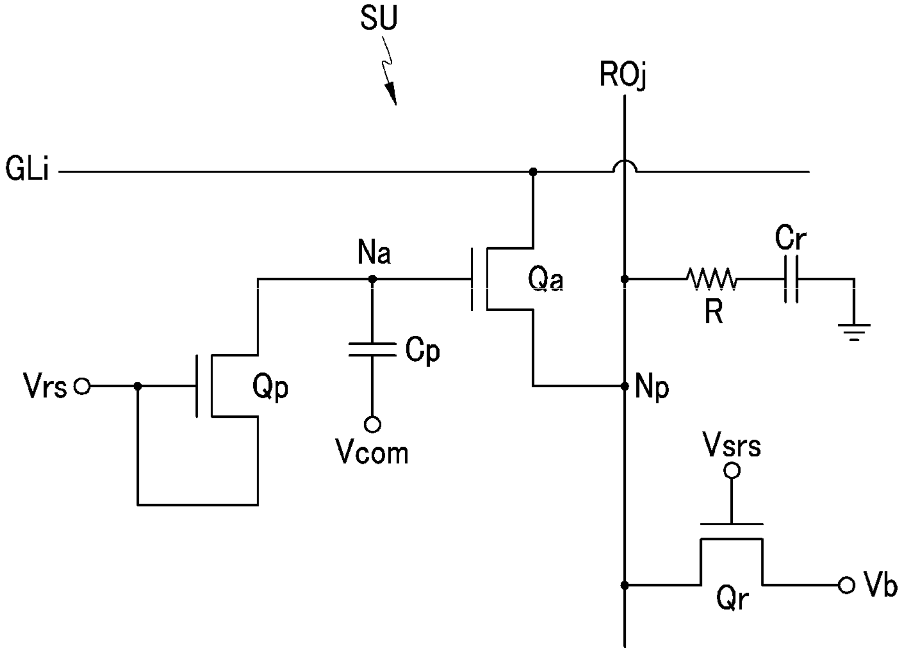
FIG. 4 is an equivalent circuit diagram of a photo sensor according to another exemplary embodiment of the present invention.

FIG. 4 is an equivalent circuit diagram of a photo sensor according to another exemplary embodiment of the present invention.

The photo sensor according to the exemplary embodiment shown in FIG. 4 is similar to the photo sensor shown in FIG. 2 described above, but the input terminal and the control terminal of the sensing element Qp are connected with each other so that each is connected to the first control signal Vrs. Accordingly, during the reset period T1 described above, the first contact point Na is charged at the high voltage V1 of the first control signal Vrs. In other respects, the features of the photo sensor and the driving method according to the exemplary embodiment shown in FIG. 4 are almost the same as the exemplary embodiment shown in FIGS. 2 and 3 described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 100: Panel | 700: Sensing signal processor |
| Cp: Sensing capacitor | GLi, GL(i + 1): Scan signal line |
| Na, Np: Node | Qa: Amplifying element |
| Qp: Sensing element | Qr: Reset element |
| ROj: Sensing signal line | SU: Photo sensor |

What is claimed is:

1. A photo sensor, comprising:
an amplifying element including an input terminal coupled to a scan line for receiving a scan signal, an output terminal configured to output a sensing signal, and a control terminal connected to a first node;
a sensing capacitor connected with the first node;
a sensing element including a control terminal connected with a terminal of a first control signal, an output terminal connected with the first node, and an input terminal; and
a reset element connected with the output terminal of the amplifying element and resetting the output terminal of the amplifying element to a first voltage according to a reset control signal.

2. The photo sensor of claim 1, wherein:
the scan signal includes a low voltage pulse which is outputted once for one frame, and
the first control signal includes a high voltage pulse which is outputted once for one frame.

3. The photo sensor of claim 2, wherein:
the reset element includes an input terminal configured to receive the first voltage, an output terminal connected with the output terminal of the amplifying element, and a control terminal configured to receive the reset control signal.

4. The photo sensor of claim 3, wherein:
the reset control signal includes a high voltage pulse configured to be received by the control terminal of the reset element at a time between the low voltage pulse of the scan signal and the high voltage pulse of the first control signal.

5. The photo sensor of claim 4, wherein:
the input terminal of the sensing element is configured to receive a second voltage.

6. The photo sensor of claim 4, wherein:
the input terminal and the control terminal of the sensing element are connected to each other so as to each receive the first control signal.

7. A display device, comprising:
a scan signal line configured to transmit a scan signal;
a sensing signal line configured to transmit a sensing signal;
an amplifying element including an input terminal connected with the scan signal line, an output terminal connected with the sensing signal line, and a control terminal connected to a first node;
a sensing capacitor connected with the first node,
a sensing element including a control terminal connected with a terminal of a first control signal, an output terminal connected with the first node, and an input terminal; and
a reset element connected with the sensing signal line and resetting the sensing signal line to a first voltage according to a reset control signal.

8. The display device of claim 7, wherein:
the scan signal includes a low voltage pulse which is outputted once for one frame, and the first control signal includes a high voltage pulse which is outputted once for one frame.

9. The display device of claim 8, wherein:

the reset element includes an input terminal configured to receive the first voltage, an output terminal connected with the sensing signal line, and a control terminal configured to receive the a reset control signal.

10. The display device of claim 9, wherein:

the reset control signal includes a high voltage pulse configured to be received by the control terminal of the reset element at a time between that of the low voltage pulse of the scan signal and that of the high voltage pulse of the first control signal.

11. The display device of claim 10, wherein:

the input terminal of the sensing element is configured to receive a second voltage.

12. The display device of claim 10, wherein:

the input terminal and the control terminal of the sensing element are connected to each other so as to each receive the first control signal.

13. The display device of claim 12, further comprising:

a sensing signal processor connected with the sensing signal line and configured to generate touch information.

14. A method of driving a photo sensor including an amplifying element with a control terminal connected to a first node, a sensing capacitor connected with the first node, a sensing element with an output terminal connected with the first node, and a reset element connected with the output terminal of the amplifying element, the method comprising:

applying a high voltage pulse of a first control signal to a control terminal of the sensing element to charge the first node at a predetermined voltage;

applying a low voltage of the first control signal to the control terminal of the sensing element to sense light;

applying a low voltage pulse of a scan signal to an input terminal of the amplifying element so as to generate differing voltages at the output terminal of the amplifying element according to whether the sensing element is being irradiated by light or not;

applying a high voltage of the scan signal to the input terminal of the amplifying element to output a sensing signal from the output terminal of the amplifying element; and applying a high voltage pulse of a reset control signal to a control terminal of the reset element to reset a voltage level of the output terminal of the amplifying element.

15. The method of claim 14, wherein:

the low voltage pulse of the scan signal is outputted once for one frame, and the high voltage pulse of the first control signal is outputted once for one frame.

16. The method of claim 15, wherein:

the input terminal of the sensing element is connected to a terminal configured to receive a first voltage.

17. The method of claim 15, wherein:

the input terminal and the control terminal of the sensing element are connected to each other so as to each receive the first control signal.

18. The method of claim 17, wherein:

the high voltage pulse of the reset control signal is applied once every 1 horizontal period.

19. The method of claim 14, wherein:

the input terminal of the sensing element is connected to a terminal of a first voltage.

20. The method of claim 14, wherein:

the input terminal and the control terminal of the sensing element are connected to each other so as to each receive the first control signal.

* * * * *